(12) United States Patent
Bain, III et al.

(10) Patent No.: US 12,014,392 B1
(45) Date of Patent: Jun. 18, 2024

(54) PARTNER EVENT GATEWAY INFRASTRUCTURE

(71) Applicant: United Services Automobile Association (USAA), San Antonio, TX (US)

(72) Inventors: Frank L. Bain, III, San Antonio, TX (US); Daniel Davidson, Little Elm, TX (US); Paul Bradford Langer, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 345 days.

(21) Appl. No.: 15/826,285

(22) Filed: Nov. 29, 2017

Related U.S. Application Data (60) Provisional application No. 62/427,431, filed on Nov. 29, 2016.

(51) Int. Cl.
| | |
|---|---|
| *G06F 15/16* | (2006.01) |
| *G06F 16/958* | (2019.01) |
| *G06Q 30/0242* | (2023.01) |
| *H04L 9/40* | (2022.01) |

(52) U.S. Cl.
CPC ....... *G06Q 30/0242* (2013.01); *G06F 16/986* (2019.01); *H04L 63/0209* (2013.01); *H04L 63/08* (2013.01); *H04L 63/108* (2013.01)

(58) Field of Classification Search
CPC . G06F 16/954; G06F 16/986; G06Q 30/0242; H04L 63/08; H04L 63/0209; H04L 63/108

USPC .............................................. 705/14.1–14.73
See application file for complete search history.

(56) References Cited

U.S. PATENT DOCUMENTS

| | | | |
|---|---|---|---|
| 6,895,507 B1 | 5/2005 | Teppler | |
| 7,975,019 B1 * | 7/2011 | Green | G06Q 30/0641 705/26.1 |
| 9,300,653 B1 * | 3/2016 | Dufel | H04L 63/0428 |

(Continued)

OTHER PUBLICATIONS

Undisturbed Rest A guide to designing perfect API by Michael Stowe, May 2015, Published by MuleSoft, (Year: 2015).*

(Continued)

*Primary Examiner* — Ilana L Spar
*Assistant Examiner* — Darnell A Pouncil
(74) *Attorney, Agent, or Firm* — Fish & Richardson P.C.

(57) ABSTRACT

Methods, systems, and apparatus, including computer programs encoded on computer storage media, for instrumenting web pages. One of the methods includes providing a host website having a plurality of registered users, the host website including links to partner websites and a script library. The method includes providing access to the host website by a user. The method includes generating a security token in response to a user activating a link of the links. The method includes directing the browser of the user to the partner website. The method includes receiving a request from a partner web page presented in the browser of the user for a script from the script library. The method includes sending the script to the browser. The method also includes receiving from the browser of the user tracking information generated by the script and identifying actions taken by the user on the partner website.

15 Claims, 8 Drawing Sheets

(56) References Cited

U.S. PATENT DOCUMENTS

| | | | | |
|---|---|---|---|---|
| 2002/0052934 | A1* | 5/2002 | Doherty | H04L 29/06 709/219 |
| 2005/0182707 | A1* | 8/2005 | Yeager | G06Q 30/08 705/37 |
| 2006/0048216 | A1* | 3/2006 | Hinton | H04L 63/0815 726/8 |
| 2008/0077561 | A1* | 3/2008 | Yomtobian | G06Q 30/02 |
| 2009/0254459 | A1* | 10/2009 | Williams | G06Q 20/10 705/26.1 |
| 2011/0107241 | A1* | 5/2011 | Moore | G06F 16/958 715/760 |
| 2011/0196731 | A1* | 8/2011 | Christie | H04L 9/3263 705/14.26 |
| 2013/0204746 | A1* | 8/2013 | Lee | G06Q 30/0625 705/26.62 |
| 2014/0259135 | A1* | 9/2014 | Postrel | H04L 63/0807 726/7 |
| 2015/0095648 | A1* | 4/2015 | Nix | H04L 9/32 713/170 |

OTHER PUBLICATIONS

Web Tracking: Mechanisms, Implications, and Defenses, Tomasz Bujlow, IEEE, p. 5 Jul. 2015 (Year: 2015).*

* cited by examiner

ABSTRACT# PARTNER EVENT GATEWAY INFRASTRUCTURE

CROSS-REFERENCE TO RELATED APPLICATION

This application is related to, and claims priority to, U.S. Application Ser. No. 62/427,431, filed on Nov. 29, 2016, the entirety of which is hereby incorporated by reference into the present disclosure.

BACKGROUND

Web analytics is the measurement, collection, analysis and reporting of web data for purposes of understanding and optimizing web usage. Web analytics applications can be used to measure the results of traditional print or broadcast advertising campaigns and to estimate how traffic to a website changes after the launch of a new advertising campaign. Web analytics provides information about the number of visitors to a website and the number of pages viewed.

SUMMARY

In general, one innovative aspect of the subject matter described in this specification can be embodied in methods that include the act of providing a host web site having a plurality of registered users, the host website including links to partner websites and a script library. The methods include the act of providing access to the host website by a user. The method includes the act of generating a security token in response to a user activating a link of the links. The methods include the act of directing the browser of the user to the partner web site. The methods include the act of receiving a request from a partner web page presented in the browser of the user for a script from the script library. The methods include the act of sending the script to the browser of the user. The methods also include the act of receiving from the browser of the user tracking information generated by the script and identifying actions taken by the user on the partner website.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The security token may include three data points: user identifier, timestamp, and time to live expressed in milliseconds. The scripts in the script library may be accessible to websites provided by a plurality of partners. The scripts in the script library may be provided in response to requests from websites provided by a plurality of partners. The scripts in the script library may cause data to be sent from the plurality of partners in a standard format. The partner website may maintain data on behalf of the host website. The user tracking information may include predetermined types of information.

Particular embodiments of the subject matter described in this specification can be implemented so as to realize one or more of the following advantages. The cost of instrumenting a web page may be reduced. Information may be standardized across multiple trading parties. Activities performed by users with partner websites may be tracked.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

There are numerous companies who provide software products for analyzing the effectiveness of an e-commerce marketing campaign. Such software performs web analytics using electronic tools such as e-marketing or e-commerce tags, which are sometimes referred to as web beacons or tracking pixels. The tags are used to implement a third party software product on a website to track the occurrences of certain business events and to report such occurrences to an interested party. This exchange between such websites has run afoul due to users disabling 3rd party cookies. Disabling third party cookies prevents the partner web site from sending cookies back to the host website which contains information about the user.

At the same time, the company or organization may be subject to a cyber attack which seeks to exploit the communication pathway between the host and the partner. The encrypted token can be used to verify the communications sent between the host and the partner are legitimate.

Described herein is a system and method for passing an encrypted token to partner website to be used by such tags to facilitate entry and link the user's activity on the partner website with the activity on the host site.

Figure 1:
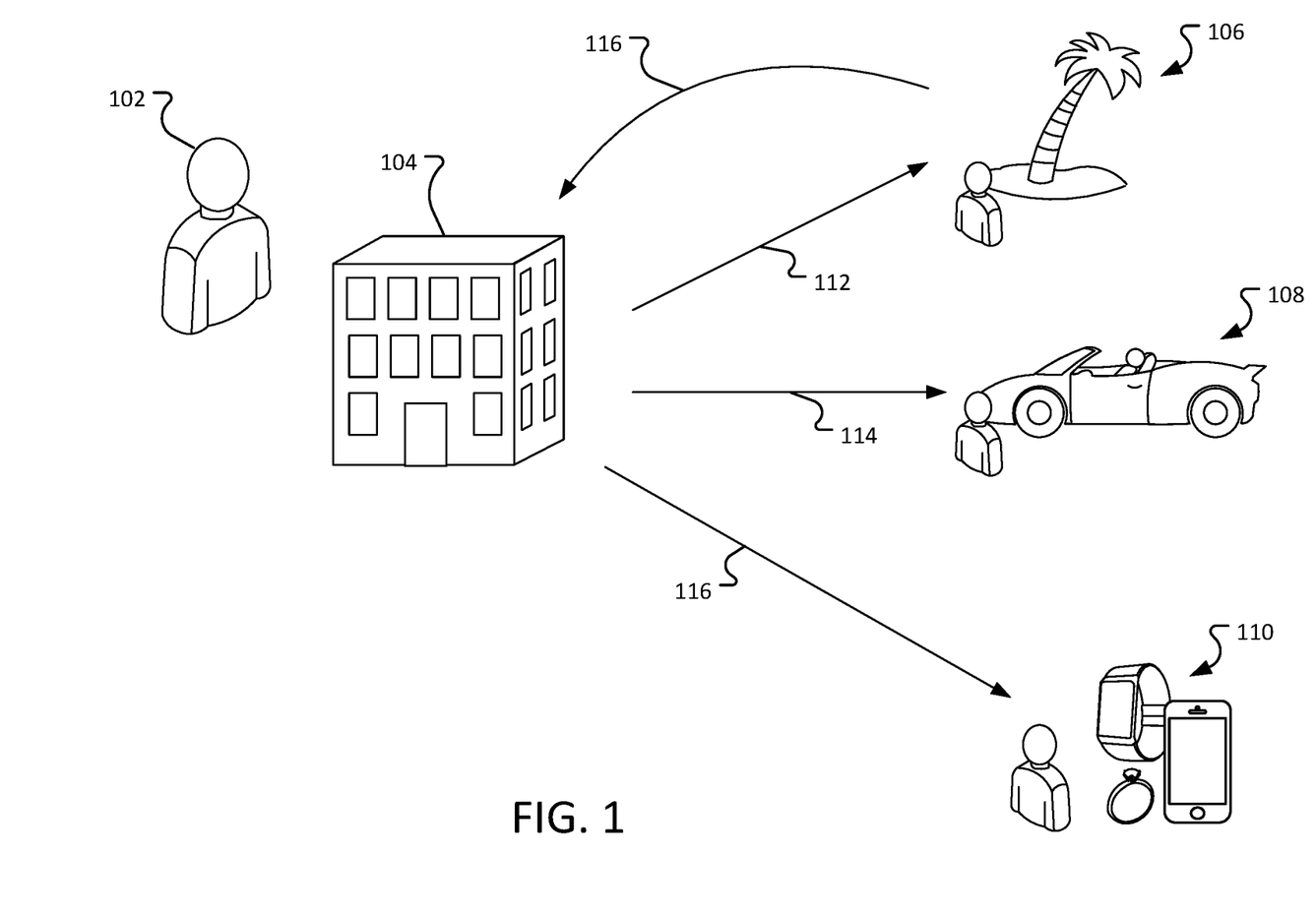
FIG. 1 illustrates an environment in which an organization provides offers to its members.
Figure 2:
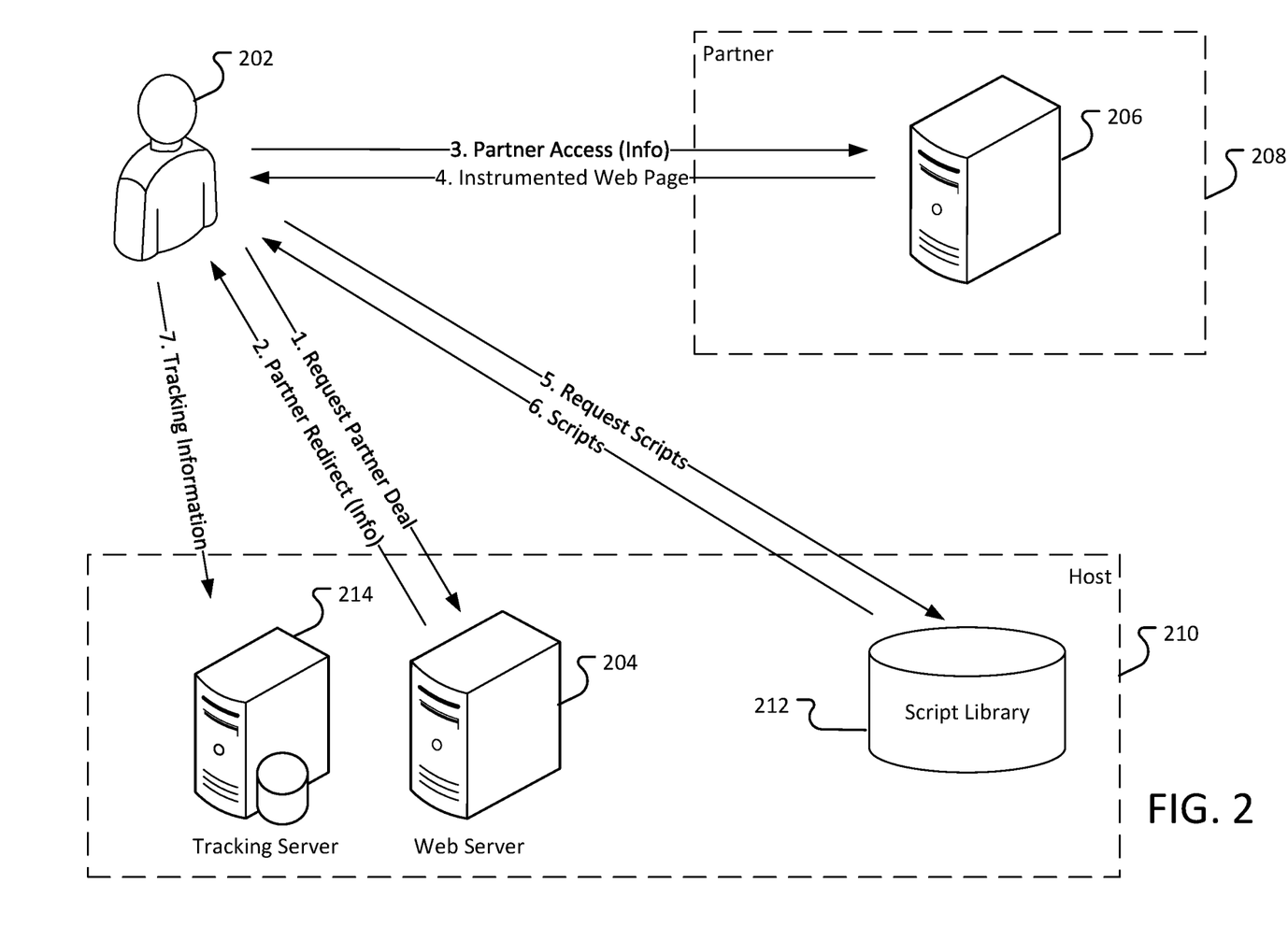
FIG. 2 illustrates an environment in which a user accesses a host and partner website.

FIG. 2 illustrates an environment in which a user accesses a host and partner website (for example, using a personal computing device). The user 202 sends a request to a host web site 204 to view partner deals. The user 202 may be, for example, a member or a customer of an organization associated with the host website.

The host webserver 204 may supply the user with an HTML page that links to a partner website. The link may include information that identifies the user as a member of the organization. The information may be, for example, a user identifier or an encrypted token. While described as a web page, the webserver may also send a redirect link to the user's browser. In general, a redirect link is a webpage which automatically sends the user to another page (for example, to the partner website).

The user 202 sends a request to the partner website 206. The partner 208 identifies the user 202 as associated with the host 210 and generates an instrumented web page. The instrumented web page contains information that enables the web page to track at least some of the user's actions on the page and to provide information regarding those actions to a tracking server. In some implementations, the web page is constructed to include at least some of the information provided by the user when requested the page. For example, the information provided by the user may include an encrypted token, an identifier, an offer identifier, etc. . . . . The partner website 206 may copy the encrypted token, identifier, or offer identifier into the web page so that the information is available when tracking the user's actions.

In some implementations, the web page may include a reference to a script stored in a script library 212. The script library 212 may be located on a device operated by the host 210. Alternatively, the script library may be provided by a third party or the partner website. The web page may request the scripts from the script library 212, for example, by sending a request to a web server (not shown) that accesses the script library 212. The scripts are provided to the user device and incorporated into the web page.

When the user 202 interacts with or loads the web page, the scripts may inform a tracking server 214 of the user's actions.

Figure 3:
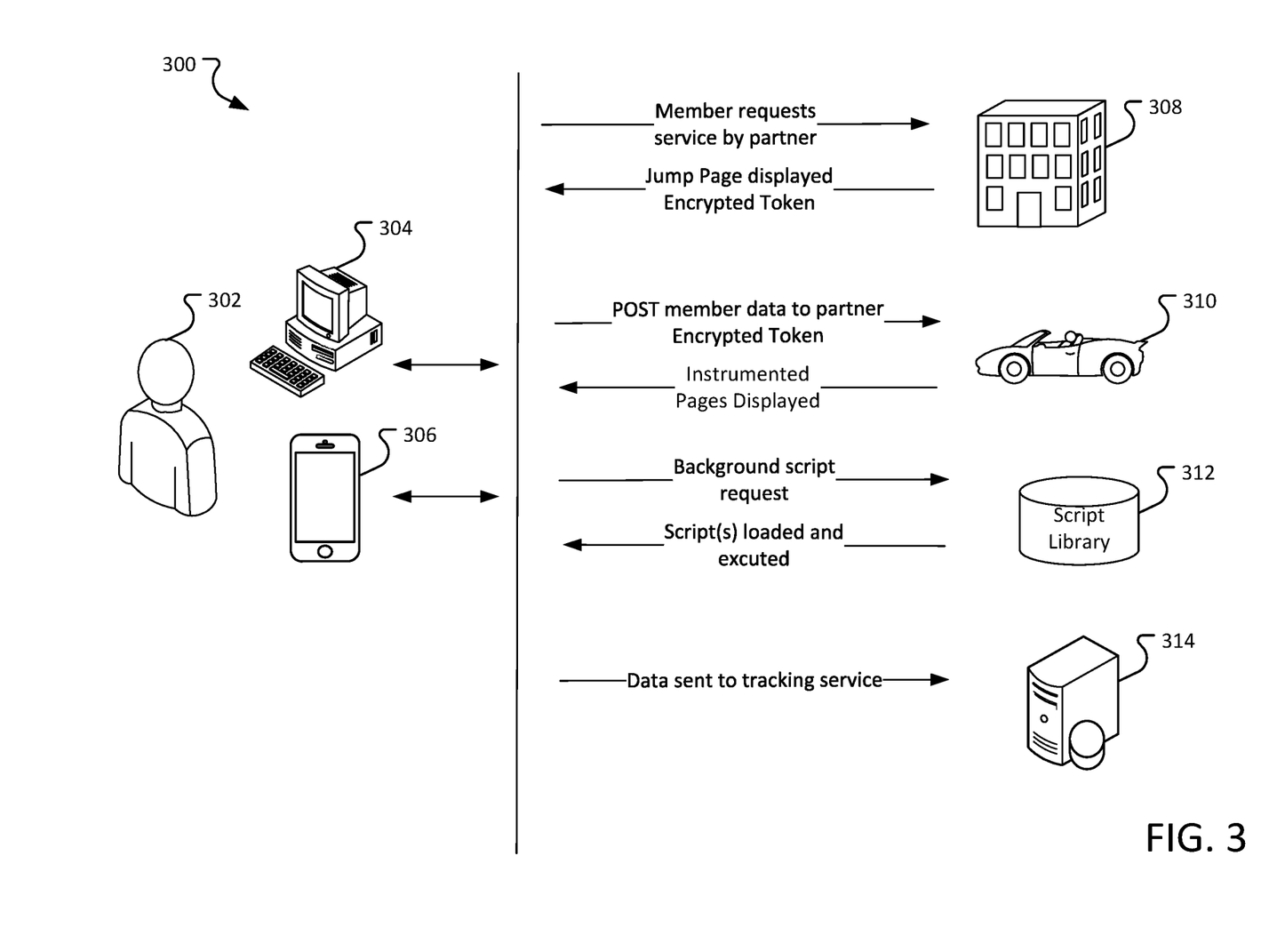
FIG. 3 illustrates another example of a user interacting with a host and partner web site.

FIG. 3 illustrates another example of a user interacting with a host and partner website. The user 302 may be operating a personal computer 304 or a mobile device 306. The user 302 requests services by a partner, for example, by exiting the host website by selecting a link to the partner site, a redirect is initiated where the member's browser is taken the partner website.

Before the user is taken to the partner website, the host site may generate an encrypted token. The encrypted token can be posted to the partner website (for example, as part of a redirect.). The partner web site may maintain the encrypted token for the duration of the session. The token may be used by the partner web site to submit tracked events to the tracking system.

When the partner receives the request and the encrypted token, the partner may present instrumented webpages to the user. The instrumented web pages can include links to scripts which can track one or more predetermined activities of the user. Activities that can be tracked include, for example, page loads, button clicks, links followed, transactions completed, etc.

When the instrumented webpage is displayed on a browser, the webpage may cause the browser to load the tracking scripts. The tracking scripts may be obtained from a script library 312. In some implementations, the scripts may be represented on the web page by a custom tag which operates in conjunction with a tag management system. The tag management system may act as the script library 312 by translating the tag into a set of one or more different scripts.

The scripts include operations which are triggered by actions taken by the user accessing the web page, as discussed above. When the scripts are triggered, data is provided to the tracking service 314.

The tracking service 314 may store and/or process the tracking information as it is received, as discussed further below.

Figure 4:
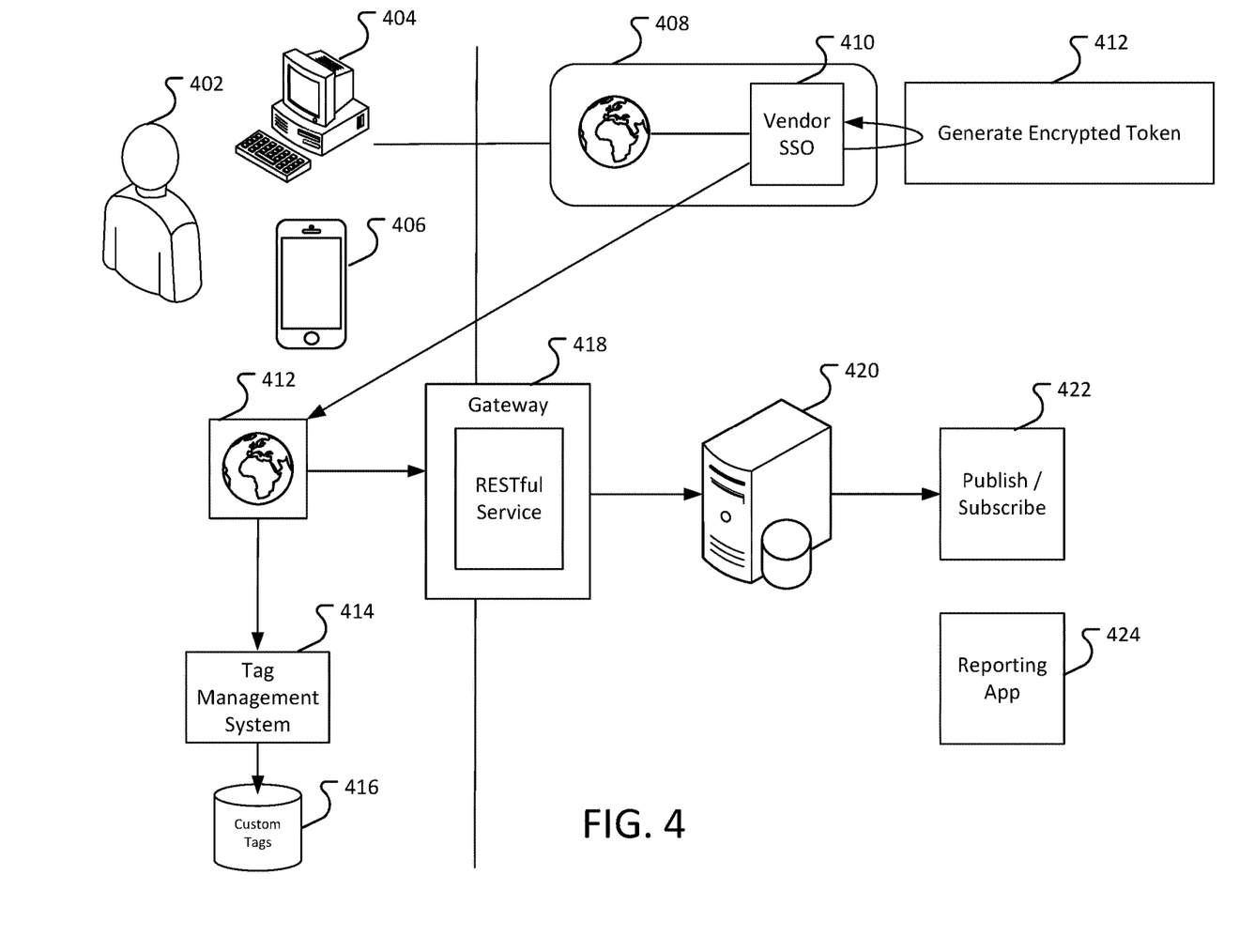
FIG. 4 illustrates an exemplary implementation of a partner event gateway.

FIG. 4 illustrates an exemplary implementation of a partner event gateway. A user 402 uses a computing device, such as a personal computer 404 or a portable device such as a smart phone 406 to access a host web site 408. The user requests access to a partner website. The host website 408 uses a vendor single sign on (SSO) to generate an encrypted token. In some implementations, the encrypted token can be used to authenticate the user with the vendor. The encrypted token can also be used to identify the user as affiliated with the host website, and therefore eligible for any offers or deals that are presented.

In some implementations, the encrypted token can be used to verify that tracking information sent from the user and the partner website is actually associated with the user and not a form of cyberattack.

The user's device is redirected to the vendor web site, which provides a web page 412. The web page 412 may include special tags within the HTML. The browser may identify the tags are part of a custom tag library 416 managed by a tag management system 414. In some implementations, each tag may correspond to one or more scripts stored in the custom tag data store 416. In some implementations, the scripts may be loaded asynchronously. Loading the scripts in this manner can ensure that an error in the loading process does not adversely affect the user's experience with the partner.

The tags may cause the user's browser to send tracking information to a gateway 418. The gateway 418 may validate the token to ensure that the tracking information is coming from a legitimate source. The gateway connects to a restful service that is responsive to an HTTP Request (for example, a POST). The RESTful service may obtain the tracking information from the HTTP request to a tracking service 420. The tracking service 420 may expose the tracking information to one or more other services using a publish and subscribe model 422. For example, a reporting application 424 may subscribe to one or more events that are raised by the tracking service 420. In some implementations, the data may be provided to the tracking service using a standard format, such as a JSON object.

An example of a script that may appear on the third parties web page is illustrated below.

```
...
<script type="text/javascript">
var HOST = HOST || window.HOST || { };
HOST.ent = HOST.ent || window.HOST.ent || { };
HOST.ent.tracker = HOST.ent.tracker || window.HOST.ent.tracker
|| { };
HOST.ent.tracker.eventData = {
  pageId : ' ',
  page : {
    referrerPage : '<xxx page calling this page>',
    pageURL : ' <xxx page url>',
    channel : 'member',
    attributes : { }
  },
  HOSTEvent : [{
    eventId : '3rd_party_storeview',
    dateTimeStamp : ' <user browser time in GMT/UTC (ISO Format)>',
    product : {
      bundleId : 'xxx000-000',
      allianceProductName : 'multi-products'
      HOSTProductId : 'multi-products'
    },
```

```
            attributes: {
            }
        }],
    user: {
        attributes : {
            sessionToken : '<passed>',
        }
    },
    version : {
        version : '1.0'
    }
},
</script>
```

Figure 5:
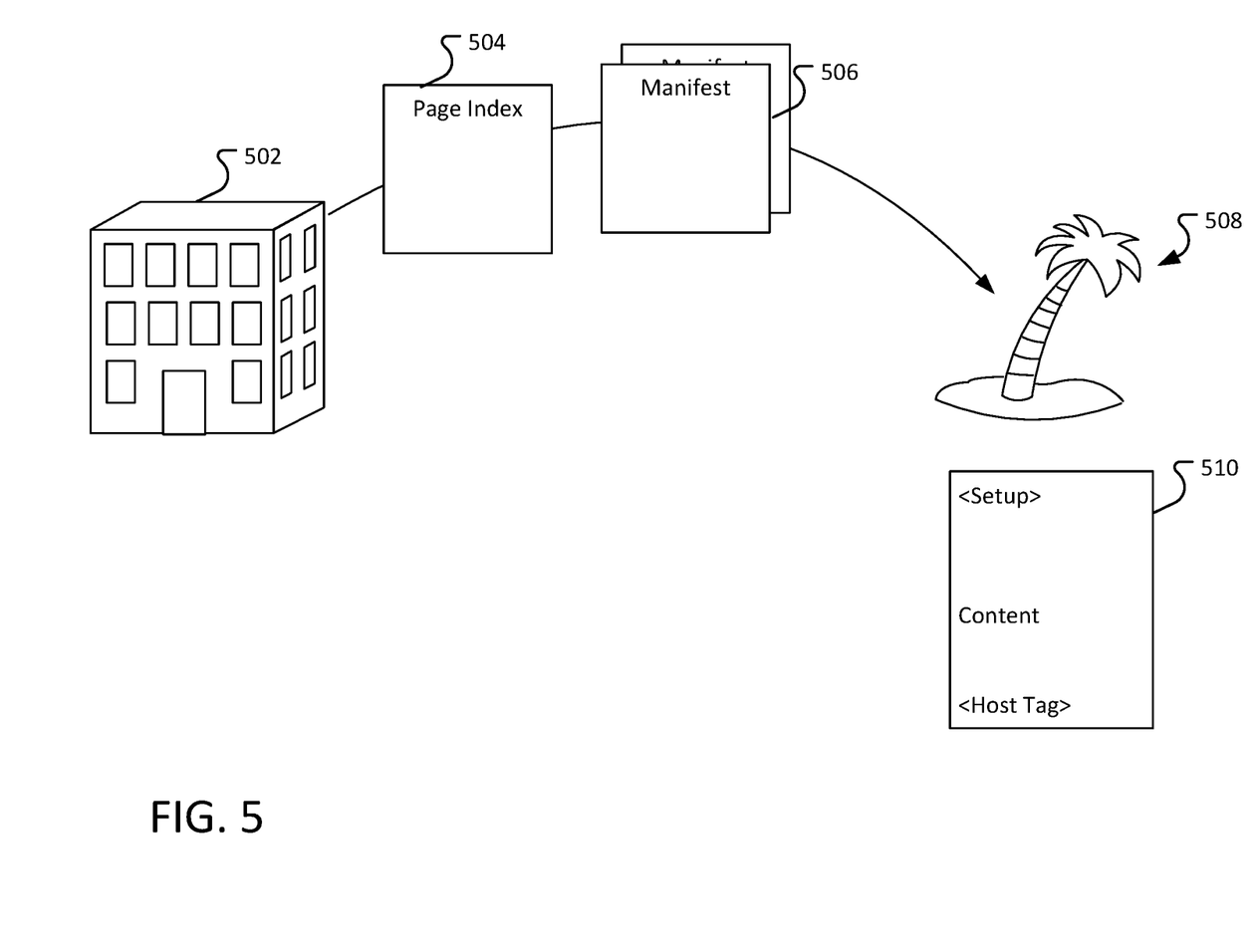
FIG. 5 illustrates an example methodology to simplify the instrumentation of partner web pages.

FIG. 5 illustrates an example methodology to simplify the instrumentation of partner web pages. The host organization 502 may provide a page index 504 and manifests 506 to the partner organization 508.

The page index 504 may communicate to the partner the different pages of interest and the different type of pages to be tracked. Below is an exemplary table that may be included as part of a page index.

| Activity | Event | Page Name | Passed to Partner | Passed to Host | Event Type |
|---|---|---|---|---|---|
| Store | Store_view | Landing Page | User ID First Name Last Name Address City State Zip | | Page load |
| Product View | browse | Widgets | | | Page load |
| Product View 2 | continue | Gadgets | | | Page load |
| Cart Purchase | complete | | | Total Discount Applied | Page load button |

The activity column identifies activity of interest. The even column identifies the name of the event. The page name identifies a reader friendly name of the page on which the identified activity and event can occur. The pass to partner identifies information that is passed from the host to the partner when the page is accessed. In this example, the host passes the User ID, First Name, Last Name, Address, City, State, and Zip code of the User when the user navigates to the landing page. The passed to Host column identifies additional data to be passed to the host when the activity of interest occurs (note: this is in addition to the encrypted token). For example, when a user completes a purchase, the partner sends the total price, and the discount applies back to the host. The Event Type column identifies the type of event that triggers that activity. For example, the event type can be a page load or a button press.

A manifest 506 may specify information that is required to implement the standard instrumentation of s web page. The manifest may include information such as the encrypted token, a version number, a channel, a user identifier, a product identifier, an event identifier (for example, corresponding to a particular action taken by the user), a page identifier (corresponding to the particular page on which the event occurred), a referrer page (the last page the user viewed prior to the event), a URL of the page, a product name, and a date and time stamp.

Below is an exemplary table representing a manifest (listing) of information to include in the tracking information. The intention of the manifest is to precisely document what is to be included in the tracking information.

Standard PEGI Fields for partner_page_1

| Attribute | Name in Script | Value | Provided by |
|---|---|---|---|
| Session Token | sessionToken | (passed) | host |
| version | version | 1.0 | host |
| Event ID | eventId | event1 | host |
| Page ID | pageId | partner_page_1 | host |
| Product Id | productId | Product 1 | host |
| host field 2 | hostField2 | content_for_host_field_2 | host |
| Referrer Page | referrerPage |  | partner |
| Page URL | pageUrl | <partner page url> | partner |
| Date/Time | dateTimeStamp | <user browser time in gmt> | partner |

The "Attribute" column describes what the field is. The "Name in Script" column identifies what data name is to be used to contain the data to be processed upon return to the host. The "Value" column is identifies what value is to assigned if the content is controlled by the host company (for instance "quote_start", or "purchase_complete"), or, what data from the web activity is to be assigned (for instance <user browser time in gmt>). The last column "Provided by" is intended to clarify which party, host or partner, is to be providing the content. In this example, sessionToken is assigned by the partner to the token passed from the host system, version is assigned to "1.0", eventId is assigned to "event1", pageId is assigned to "partner_page_1", productId is assigned to "Product1", hostField2 is assigned to "content_for_host_field_2", referrerPage is assigned to the partner page that called the current page, pageUrl is assigned to the current partner page url, dateTimeStamp is assigned to the current user browser time in gmt.

In some implementations, values provided by the host web server are "passed through" to the vendor web page, for example, as scripting parameters or hidden fields on the HTML page.

The manifest may be expanded to include additional data elements and data types as necessary.

Additionally, the scripts loaded onto the partner web page may collect additional information, such as the HTTP version and protocol, the time the request was performed, the Uniform Resource Identifier (URI), the User Agent (an attribute that includes detailed information about the user's browser), and the session identifier provided by the script library system.

The partner organization 508 can use the manifest to generate or develop the web pages 510 that are provided to the users. The manifest may also identify types of events to track.

In some implementations the web pages 510 may provide tracking information when the page loads and when particular items are selected (such as a button is clicked).

Reproduced below is an example of a script that can be used to send tracking information on a load event.

```
<script type="text/javascript">
(function(a,b,c,d){
    a='http://tracker.host.com/Tracker/prod/utag.js';
    b=document;c='script';d=b.createElement(c);d.src=a;
    d.type='text/java'+c;d.async=true;
    a=b.getElementsByTagName(c)[0];a.parentNode.insertBefore(d,a);
}) ( );
</script>
```

Providing data on a button click may require a separate script. An example of a script for sending tracking information on a button click is reproduced below. This script creates sendTrackerData( ) javascript function that can called by the button to track.

```
<script type="text/javascript">
    function sendTrackerData( ) {
        var TrackerLoaded = false;
        if (Host.ent.Tracker.init) {
            // send eventData
            TrackerLoaded = true;
            try {
                HOST.ent.Tracker.init( );
            } catch (err) {
                // do nothing
            }
        }
        if (typeof utag !== 'undefined' && utag.view) {
            // send digitalData
            TrackerLoaded = true;
            try {
                // collect updated data
                utag.pagevars( ) ;
                utag.view(utag.data);
            } catch (err) {
                // do nothing
            }
        }
        if (TrackerLoaded === false){
            // scripts not loaded, load the scripts
            (function (a, b, c, d) {
                a = '//tms.HOST.com/Tracker/prod/utag.js';
                b = document; c = 'script'; d = b.createElement(c);
    d.src = a; d.type = 'text/java' + c; d.async = true;
                a = b.getElementsByTagName(c) [0];
    a.parentNode.insertBefore(d, a);
            })( );
        }
    }
</script>
```

The sendTrackerData function may be called from the onClick even of the button. For example,     <button onclick="SendTrackerData( )">Do Something</button>

The above javascript is provided as an example only, other scripts may be generated to perform similar or related functions. Further, the scripts may not need to be added manually by the partner, instead, the scripts may be loaded using the script library. The partner web page may, instead, merely provide the relevant tracking details.

For example, the partner may include a custom tag into the webpage which causes the browser to load the scripts illustrated above.

Figure 6:
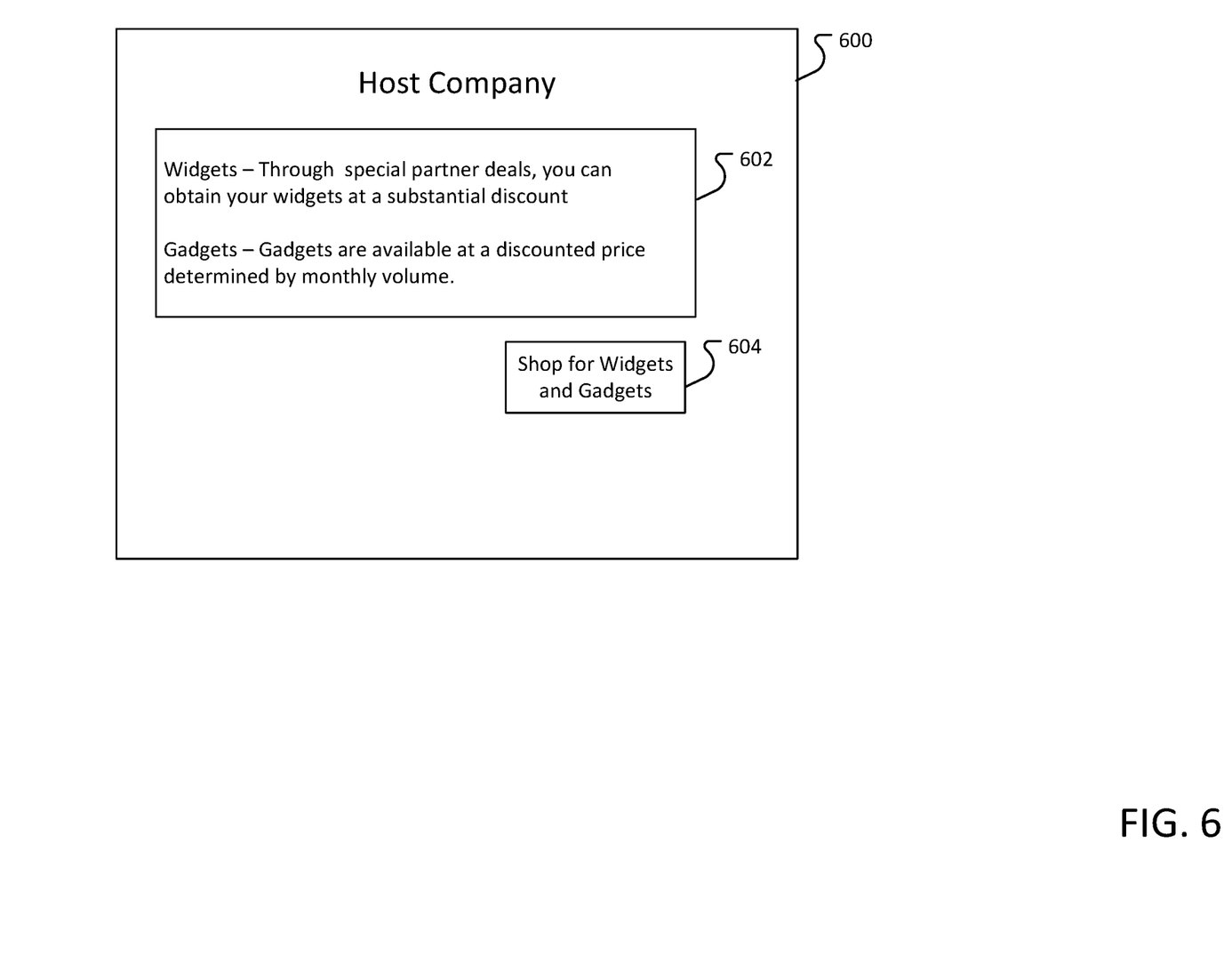
FIG. 6 illustrates an example of a host webpage that begins establishing a connection to the partner website.

FIG. 6 illustrates an example of a host webpage that begins establishing a connection to the partner website. In this example, the host webpage displays information about the partnered opportunities that the host company provides 602. In this example, the host has a deal with a partner to provide discounted widgets and gadgets. When the user selected the 'shop for widgets and gadgets' button, the host system generates a token (for example, as shown in FIG. 4). The host system provides a redirect which redirects the user's browser to the partner website. In some implementations, the redirect page may notify the user that they are being transferred away from the host system and to the partner system.

Figure 7:
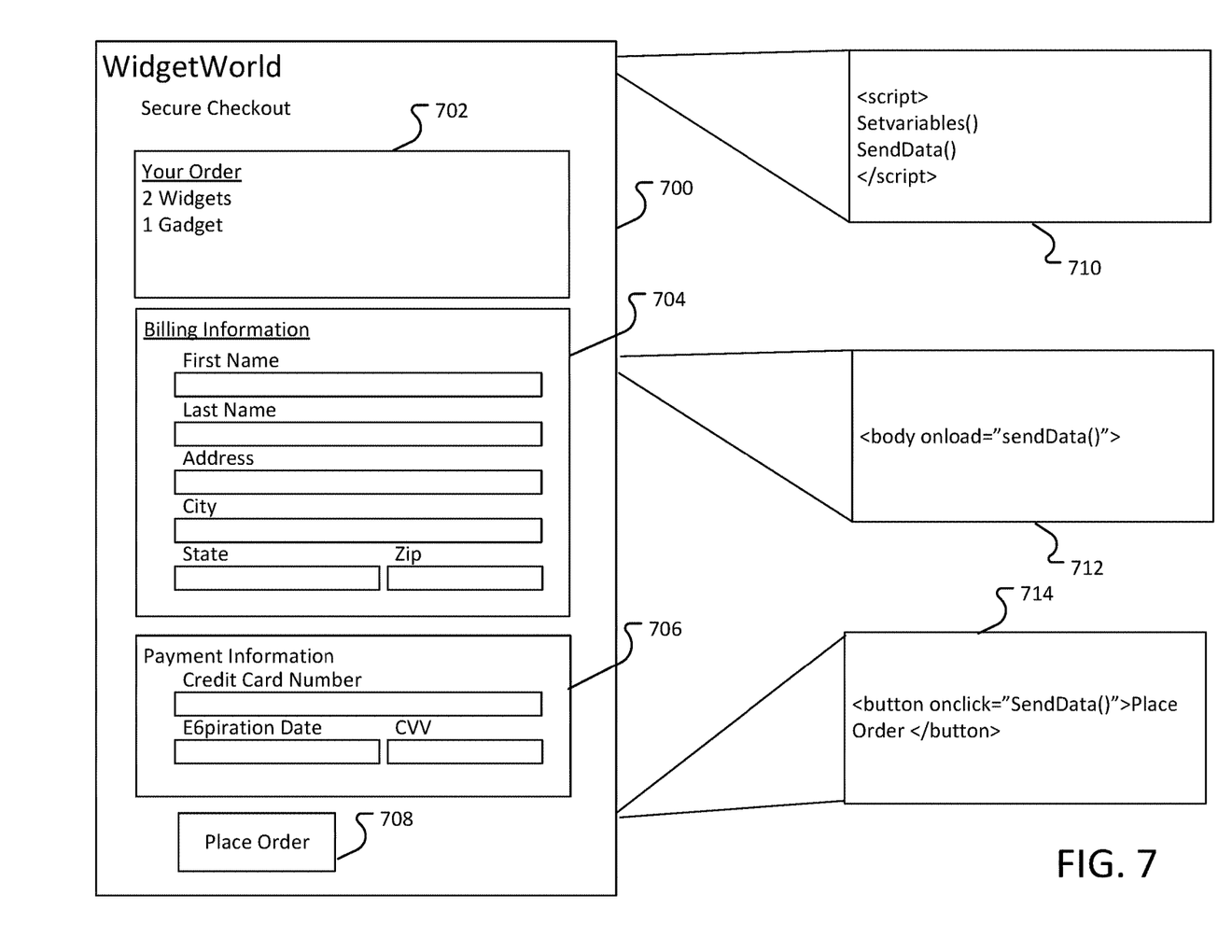
FIG. 7 illustrates an example of an instrumented web page.

FIG. 7 illustrates an example of an instrumented partner web page 700. In this example, the web page 700 is associated with a fictional company WidgetWorld. The web page 700 is an order checkout page. The web page includes an order summary section 702, a billing information section 704, a payment information section 706, and a place order button 708.

The HTML the causes the web page 700 to be presented to the user may send data based on various events. A first portion 710 of the HTML page includes scripts that set variables (for example, the variable specified by the manifest and passed to the partner web server by the host webserver (for example, via a redirect link on the user's browser). The variables may also specify predetermined information that the partner wishes to send to the tracking system. The first portion 710 may also cause the data to be sent to the tracking system. Because the script portion is executed prior to the display of the page, the script may have limited access to data on the page. For example, the web browser on the client device may process the script command before processing the body of the HTML page.

If the partner and host agree to track information about the contents of the body, a second portion 712 of the HTML page can include a call to the send data script when the body of the HTML page is loaded by the web browser.

The web page 700 can also send data to the tracking server when a button is pressed. An example script was presented above and is included in a third portion 714 of the web page 702. When the user clicks the "place order" button 708, the script causes the user's web browser to send information to the tracking server.

Figure 8:
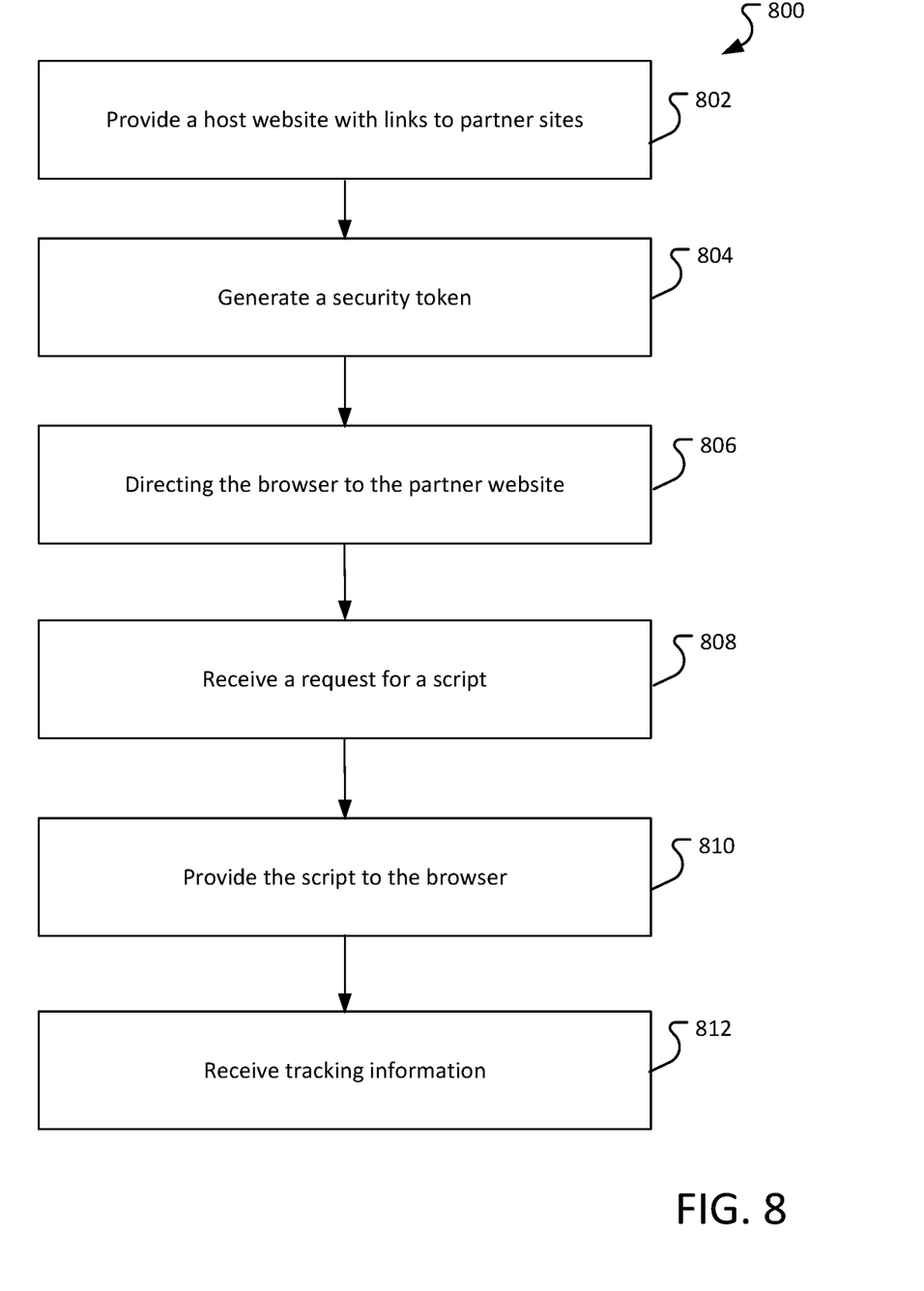
FIG. 8 is a flow chart of an exemplary process for instrumenting a web page.

FIG. 8 is a flow chart of an exemplary process 800 for instrumenting a web page. The process can be performed by a computer system that includes, for example, a web server, a script library, and a tracking server.

The process 800 provides 802 a host website having a plurality of registered users, the host website including links to partner websites and a script library.

The process 800 provides access to the host website by a user. The user may elect to navigate one of the links to access a partner web site.

The process 800 generates 804 a security token at the host website in response to a user activating a link of the links.

The process 800 directs 806 the browser of the user to the partner web site.

The process 800 receives 808 a request from a partner web page presented in the browser of the user for a script from the script library. For example, the partner web page may include special tags that the browser identifies as being associated with a script. Alternatively, the partner page may include a script by reference.

The process 800 provides 810 the script to the browser of the user. The browser may load the script into memory and execute the script according to predetermined criteria.

The process 800 receives 812 from the browser of the user tracking information generated by the script and identifying actions taken by the user on the partner website. The tracking information may include information provided by the host website, for example, the encrypted token.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural or object-oriented or functional languages, and it can be deployed in any form, including as a stand-alone program or as a module, component, subroutine, service, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital, analog or quantum computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data (e.g., electronic, magnetic, magneto-optical disks, or optical disks), however, a computer need not have such devices. Moreover, a computer can be embedded in another device (e.g., a mobile telephone, a personal digital assistant (PDA), a mobile audio or video player, a game console, a GPS receiver, or a portable storage device (e.g., a universal serial bus (USB) flash drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front-end components. The components of the system can be interconnected by any form or medium of digital or optical data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   providing a host website including links to partner websites and a script library;
   providing, to a user device of a user, access to the host website;
   generating a security token in response to the user activating a link of the links, the security token identifying the user as being affiliated with the host website, the security token comprising three data points: a user identifier, a timestamp, and time to live expressed in milliseconds;
   sending the security token to the partner website corresponding to the activated link;
   directing a browser of the user device to the partner website corresponding to the activated link that causes a partner web page of the partner web site to be presented in the browser, the partner web page including one or more tags from a tag library, each tag corresponding to one or more scripts stored in the script library;
   receiving a request from the partner web page presented in the browser of the user device for tracking scripts from the script library;
   translating the one or more tags into one or more tracking scripts stored in the script library, the one or more tracking scripts comprising one or more operations that are executed if one or more user activities occur on the partner web page;
   loading the one or more tracking scripts from the script library into the partner web page asynchronously;
   detecting that at least one of the one or more user activities occur on the partner web page;
   executing the one or more operations of the one or more tracking scripts;
   causing, using the one or more tags from the tag library, the browser of the user device to send tracking information including the security token to a gateway;
   validating, using the gateway, the security token to ensure that the tracking information is coming from an authorized source;
   connecting, through the gateway, to a representational state transfer service that is configured to receive the tracking information in response to the request, the tracking information being generated by the execution of the one or more operations of the tracking scripts and identifying the at least one of the one or more user activities occurring on the partner web page;
   verifying, using the gateway, based on the security token, that the tracking information received from the partner web page is associated with the user; and
   sending, through the gateway and the representational state transfer service, the tracking information including the security token to a tracking service system that is configured to expose the tracking information to one or more other services.

2. The method of claim 1, wherein the scripts in the script library are accessible to websites provided by a plurality of partners.

3. The method of claim 1, wherein the scripts in the script library cause data to be sent from the plurality of partners in a standard format.

4. The method of claim 1, wherein the partner web page maintains data on behalf of the host website.

5. The method of claim 1, wherein the tracking information comprises predetermined types of information.

6. A system, comprising:
   at least one processor; and
   a memory communicatively coupled to the at least one processor, the memory storing instructions which, when executed by the at least one processor, cause the at least one processor to perform operations comprising:
   providing a host website including links to partner websites and a script library;
   providing, to a user device of a user, access to the host website;
   generating a security token in response to the user activating a link of the links, the security token identifying the user as being affiliated with the host website, the security token comprising three data points: a user identifier, a timestamp, and time to live expressed in milliseconds;
   sending the security token to the partner website corresponding to the activated link;
   directing a browser of the user device to the partner website corresponding to the activated link that causes a partner web page of the partner website to be presented in the browser, the partner web page including one or more tags from a tag library, each tag corresponding to one or more scripts stored in the script library;
   receiving a request from the partner web page presented in the browser of the user device for tracking scripts from the script library;
   translating the one or more tags into one or more tracking scripts stored in the script library, the one or more tracking scripts comprising one or more operations that are executed if one or more user activities occur on the partner web page;
   loading the one or more tracking scripts from the script library into the partner web page asynchronously;

detecting that at least one of the one or more user activities occur on the partner web page;

executing the one or more operations of the one or more tracking scripts;

causing, using the one or more tags from the tag library, the browser of the user device to send tracking information including the security token to a gateway;

validating, using the gateway, the security token to ensure that the tracking information is coming from an authorized source;

connecting, through the gateway, to a representational state transfer service that is configured to receive the tracking information in response to the request, the tracking information being generated by the execution of the one or more operations of the tracking script and identifying the at least one of the one or more user activities occurring on the partner web page;

verifying, using the gateway, based on the security token, that the tracking information received from the partner web page is associated with the user; and sending, through the gateway and the representational state transfer service, the tracking information including the security token to a tracking service system that is configured to expose the tracking information to one or more other services.

7. The system of claim 6, wherein the scripts in the script library are accessible to websites provided by a plurality of partners.

8. The system of claim 6, wherein the scripts in the script library cause data to be sent from the plurality of partners in a standard format.

9. The system of claim 6, wherein the partner web page maintains data on behalf of the host website.

10. The system of claim 6, wherein the tracking information comprises predetermined types of information.

11. A non-transitory computer-readable media storing instructions which, when executed by at least one processor, cause the at least one processor to perform operations comprising:

providing a host website including links to partner websites and a script library;

providing, to a user device of a user, access to the host website;

generating a security token in response to the user activating a link of the links, the security token identifying the user as being affiliated with the host website, the security token comprising three data points: a user identifier, a timestamp, and time to live expressed in milliseconds;

sending the security token to the partner web site corresponding to the activated link;

directing a browser of the user device to the partner website corresponding to the activated link that causes a partner web page of the partner web site to be presented in the browser, the partner web page including one or more tags from a tag library, each tag corresponding to one or more scripts stored in the script library;

receiving a request from the partner web page presented in the browser of the user device for tracking scripts from the script library;

translating the one or more tags into one or more tracking scripts stored in the script library, the one or more tracking scripts comprising one or more operations that are executed if one or more user activities occur on the partner web page;

loading the one or more tracking scripts from the script library into the partner web page asynchronously;

detecting that at least one of the one or more user activities occur on the partner web page;

executing the one or more operations of the one or more tracking scripts;

causing, using the one or more tags from the tag library, the browser of the user device to send tracking information including the security token to a gateway;

validating, using the gateway, the security token to ensure that the tracking information is coming from an authorized source;

connecting, through the gateway, to a representational state transfer service that is configured to receive the tracking information in response to the request, the tracking information being generated by the execution of the one or more operations of the tracking script and identifying the at least one of the one or more user activities occurring on the partner web page;

verifying, using the gateway, based on the security token, that the tracking information received from the partner web page is associated with the user; and sending, through the gateway and the representational state transfer service, the tracking information including the security token to a tracking service system that is configured to expose the tracking information to one or more other services.

12. The non-transitory computer-readable media of claim 11, wherein the scripts in the script library are accessible to websites provided by a plurality of partners.

13. The non-transitory computer-readable media of claim 11, wherein the scripts in the script library cause data to be sent from the plurality of partners in a standard format.

14. The non-transitory computer-readable media of claim 11, wherein the partner web page maintains data on behalf of the host website.

15. The non-transitory computer-readable media of claim 11, wherein the tracking information comprises predetermined types of information.

* * * * *